United States Patent [19]
Giard

[11] Patent Number: 6,003,405
[45] Date of Patent: Dec. 21, 1999

[54] BICYCLE HANDLEBAR BAR ENDS

[75] Inventor: Edward Giard, Sun Prairie, Wis.

[73] Assignee: Trek Bicycle Corporation, Waterloo, Wis.

[21] Appl. No.: 09/114,326

[22] Filed: Jul. 13, 1998

[51] Int. Cl.⁶ .................................................. B62K 21/12
[52] U.S. Cl. ........................................ 74/551.3; 74/551.8
[58] Field of Search ................................ 74/551.3, 551.8, 74/551.1; D12/114, 178

[56] References Cited

U.S. PATENT DOCUMENTS

| | | | |
|---|---|---|---|
| 4,137,793 | 2/1979 | Sowell | 74/551.8 X |
| 5,193,930 | 3/1993 | Chi | 74/551.1 X |
| 5,224,396 | 7/1993 | Lobbezoo et al. | 74/551.3 |
| 5,421,220 | 6/1995 | Chen | 74/551.8 |
| 5,570,614 | 11/1996 | Nastrucci | 74/551.8 X |
| 5,881,606 | 3/1999 | Roddy | 74/551.3 |

OTHER PUBLICATIONS

Oct. 1995 issue BMX Plus! magazine: cover page and 11 select pages (7 unidentified and pp. 25, 33, 80, 82).

Kalloy Industrial Co., Ltd. drawing, No. 85,02,16, date unknown.

*Primary Examiner*—Mary Ann Battista
*Attorney, Agent, or Firm*—Nilles & Nilles, S.C.; James F. Boyle

[57] ABSTRACT

A bicycle handlebar bar end for attachment to a handlebar on a bicycle includes a continuous wall section which extends continuously and completely around the handlebar from one side to the other of a tubular body member of the bar end without any gaps or spaces therebetween. A slot in the center of the tubular body member of the bar end provides a means for reducing the diameter of the central opening formed by the continuous wall section for attaching and tightening the bar end onto the end of the handlebar.

4 Claims, 8 Drawing Sheets

BICYCLE HANDLEBAR BAR ENDS

BACKGROUND OF THE INVENTION

1. Field of the Invention

The present invention relates to bicycle handlebar bar ends for attachment to a handlebar on a bicycle.

2. Discussion of the Related Art

On a traditional two-wheel bicycle, the front wheel is of course controlled through the use of a handlebar attached to the front steering fork. On bicycles designed primarily for road riding and in particular for racing, the handlebar is commonly comprised of a generally horizontal tubular member which provides a first pair of gripping surfaces for the rider's hands, and attached to the extreme ends of the handlebar are bar ends which provide a second pair of gripping surfaces. The first pair of gripping surfaces are used in situations where the rider desires to ride in a relatively upright posture. The second pair of gripping surfaces are normally positioned forward of the first set, the second set of gripping surfaces being used when the rider desires to ride in a relatively crouched position. The upright position enables the rider to exert maximum power to the pedals for starting a race while the crouched position reduces drag due to air resistance when riding at higher speeds.

The bar ends are commonly tubular members having a clamping means for attaching the bar end to the ends of the tubular handlebar. In prior art bar ends the clamping means for attaching the bar ends to the handlebar has typically consisted of a common C-clamp formed by a wall portion which extends from one side of the tubular portion of the bar end around the handlebar. The handlebar is inserted through a substantially cylindrical opening formed by the wrap-around wall portion of the bar end. The end of the wrap-around wall portion is spaced apart slightly from the opposite side of the tubular portion of the bar end. The end of the wrap-around wall portion is normally fastened to the tubular portion of the bar end with a common threaded fastener. Tightening the fastener causes a compression of the space between the end of the wrap-around wall portion and the tubular portion of the bar end which in turn causes a reduction in the diameter of the cylindrical opening to thereby attach and tighten the bar end onto the end of the handlebar.

In such prior art bar ends it is the end of the wrap-around wall portion of the C-clamp which defects the most. Consequently, the clamping force is concentrated mostly on a small area at the end of the wrap-around wall portion. This concentrated force causes some handlebars to become deformed, which is of course aesthetically undesirable particularly on a new bicycle, and in some cases where the handlebar is made of a lightweight composite material the handlebar has been known to fail because of cracking of the composite material.

An improved handlebar bar end is therefore desired.

SUMMARY OF THE INVENTION

Bicycle handlebar bar ends having an improved clamping means for attaching the bar ends to the handlebar of a bicycle is disclosed.

A bar end is comprised of a tubular body member capable of attachment to the handlebar of a bicycle. The clamping means for attaching the bar ends to the handlebar is comprised of a continuous wall section which extends completely and continuously around the handlebar. There are no spaces or gaps in the wall section which wraps around the handlebar. Instead the wall section is a unitary portion of the bar end which stretches from one side portion of the tubular body member of the bar completely around the backside of the handlebar and is integrally re-joined onto the opposite side portion of the tubular body member. The means for tightening the bar end onto the handlebar is provided not by any break in the wall portion which wraps around the handlebar but rather by a slot which extends inwardly into the center of the tubular body member of the bar end. A fastener is provided, which, upon tightening, compresses the slot to thereby reduce the circumference of the wall section which surrounds the handlebar and thereby tighten the bar end. This method of clamping provides a much more uniform clamping force around the entire outer circumference of the handlebar.

Other objects, features and advantages of the present invention will become apparent to those skilled in the art from the following detailed description and accompanying drawings.

BRIEF DESCRIPTION OF THE DRAWINGS

The drawings, which constitute a part of this specification and include an exemplary embodiment of the present invention, include the following.

DETAILED DESCRIPTION OF THE PREFERRED EMBODIMENT

A traditional two-wheel bicycle is commonly comprised of a frame 20, a front wheel 21, a rear wheel, a seat, pedals and a steering assembly comprised of a steering fork 22 and handlebar 23. The steering fork 22 includes a crown, two downwardly extending front fork stays to which the front wheel 21 is attached, and an upward extending steering tube which is inserted through the neck of the frame 20. A clamping device known as a stem 24 is used for attaching the handlebar 23 to the top of the steering tube.

Figure 1:
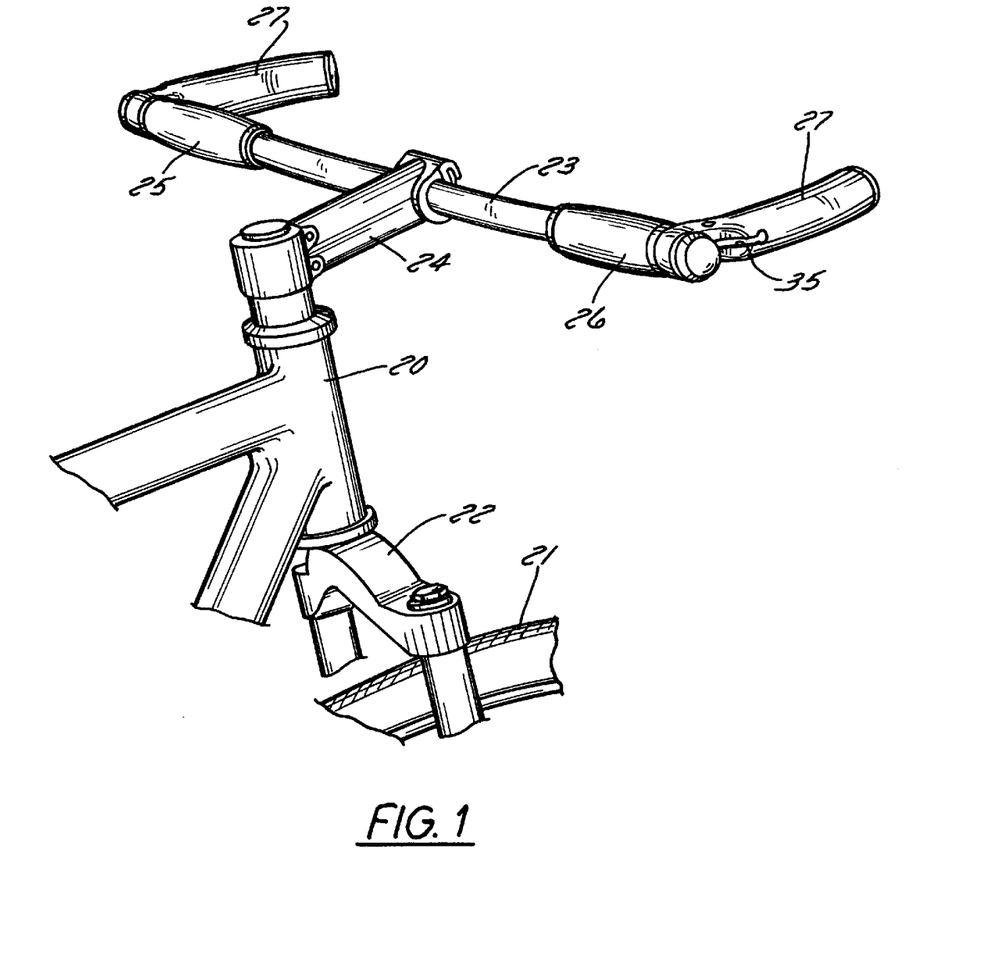
FIG. 1 is a perspective view of the front portion of a bicycle showing the first embodiment of the bicycle handlebar bar ends disclosed herein mounted onto a bicycle.
Figure 2:
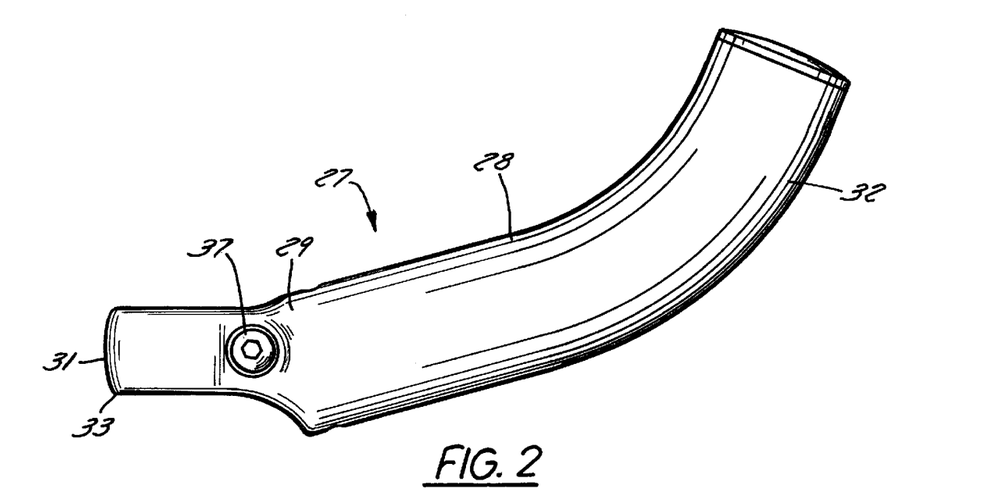
FIG. 2 is a top view of the first embodiment of the bicycle handlebar bar end disclosed herein.
Figure 3:
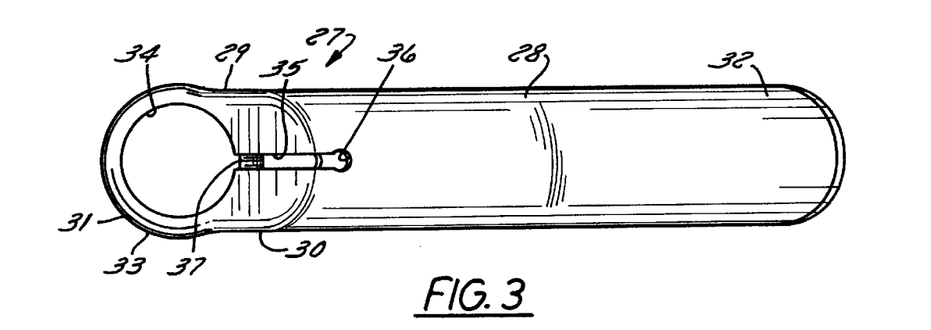
FIG. 3 is a side view of the first embodiment of the bar end.
Figure 4:
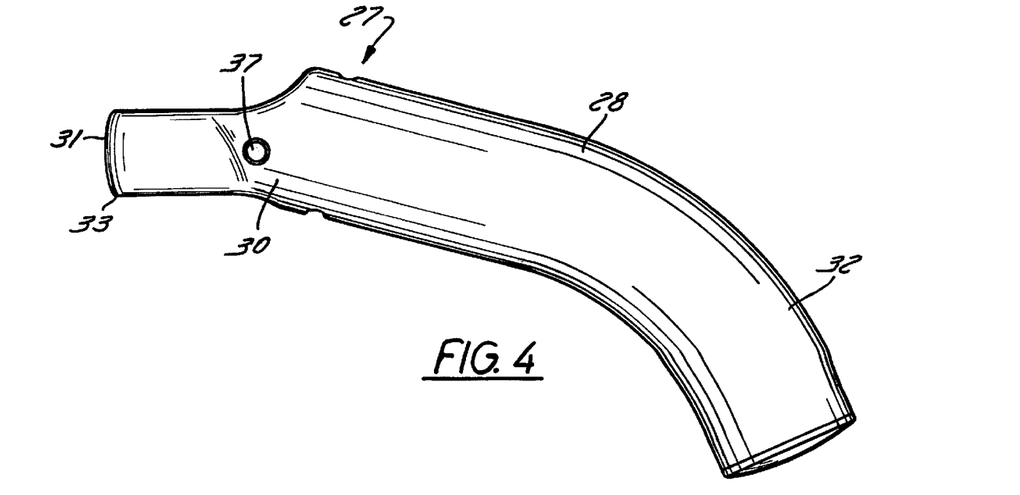
FIG. 4 is a bottom view of the first embodiment of the bar end.
Figure 5:
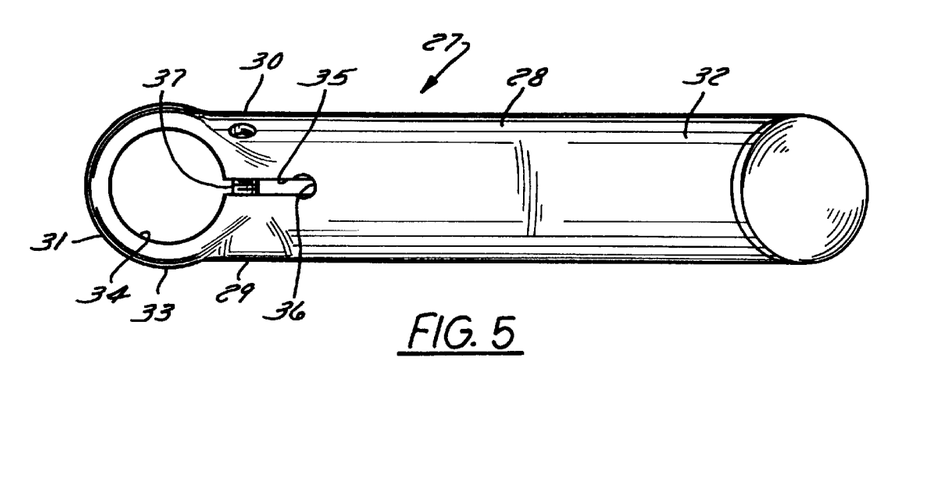
FIG. 5 is a side view (opposite FIG. 3) of the first embodiment of the bar end.
Figure 6:
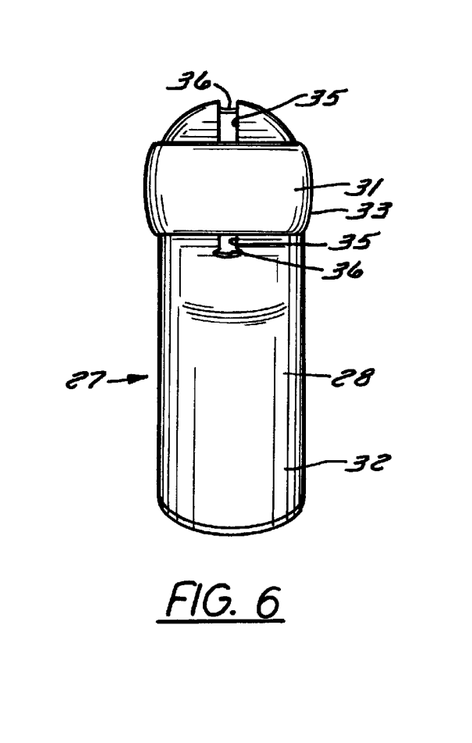
FIG. 6 is a rear view of the first embodiment of the bar end.
Figure 7:
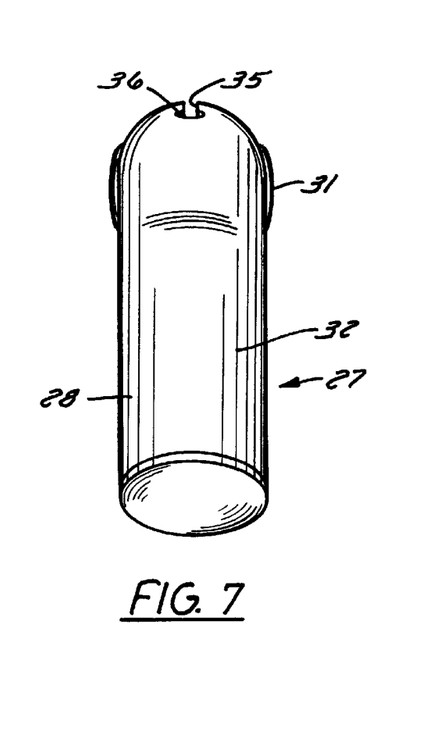
FIG. 7 is a front view of the first embodiment of the bar end.
Figure 8:
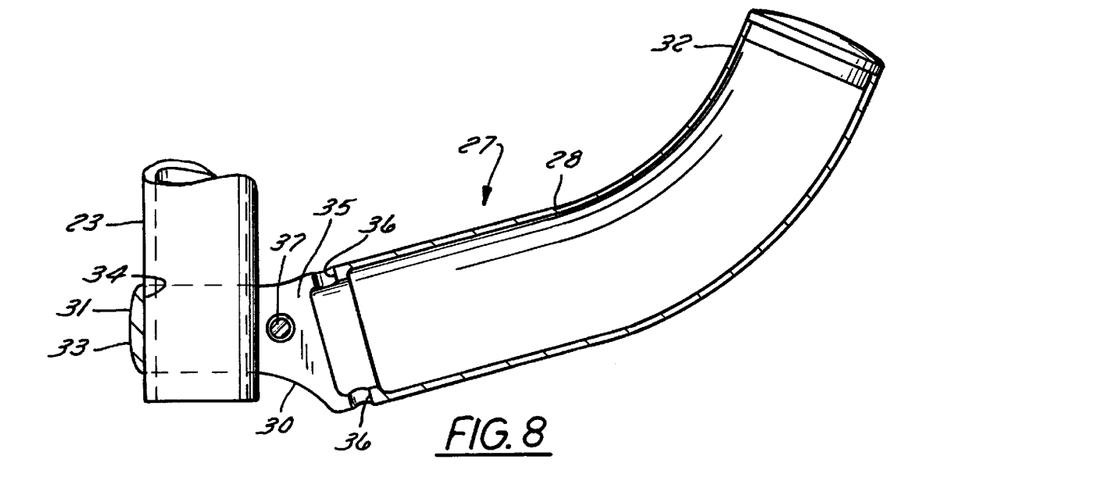
FIG. 8 is a cross sectional view of the first embodiment of the bar end illustrating the clamping means for attaching the bar end to the handlebar on the bicycle.
Figure 9:
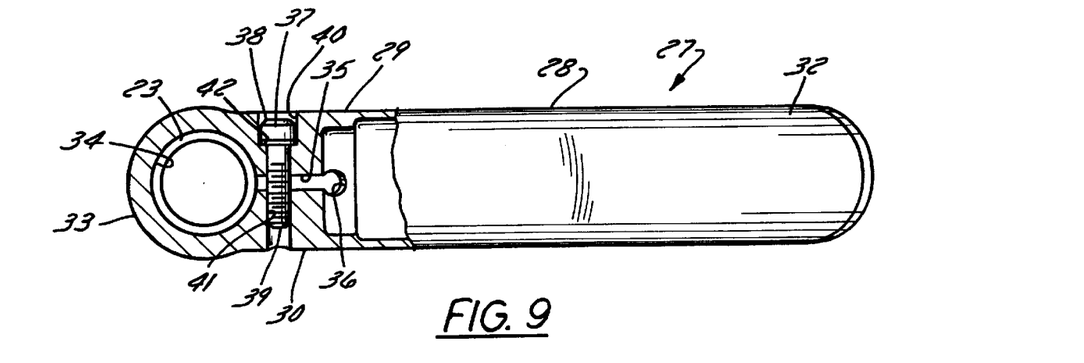
FIG. 9 is a partial sectional view of the first embodiment of the bar end illustrating the clamping means for attaching the bar end to the handlebar on the bicycle.
Figure 10:
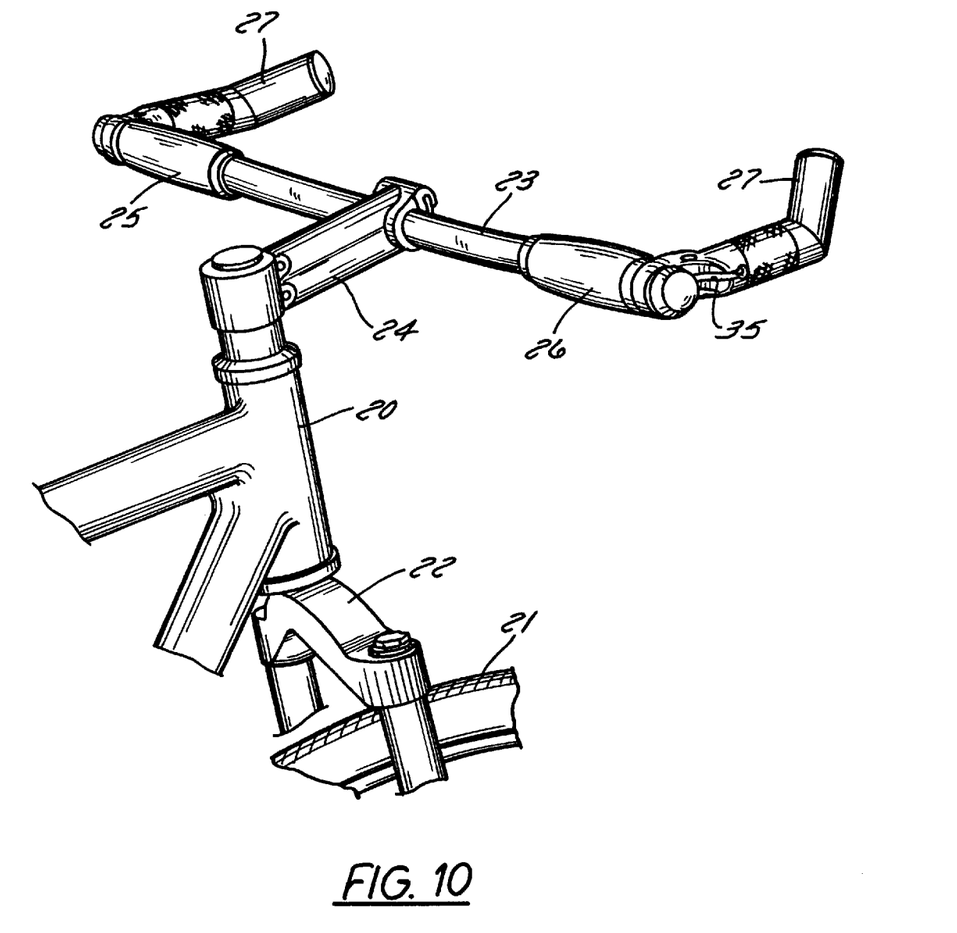
FIG. 10 is a perspective view of the front portion of bicycle showing a second embodiment of the bicycle handlebar bar ends mounted onto a bicycle.
Figure 11:
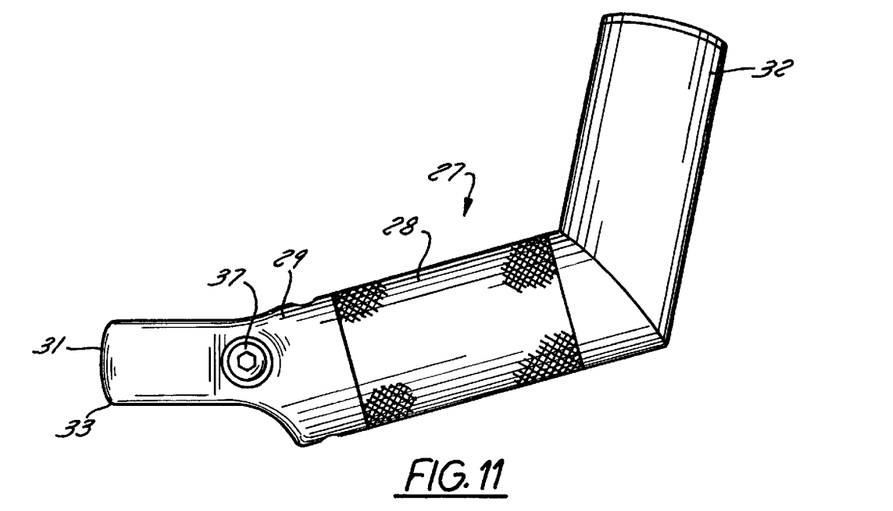
FIG. 11 is a top view of the bicycle handlebar bar end disclosed herein.
Figure 12:
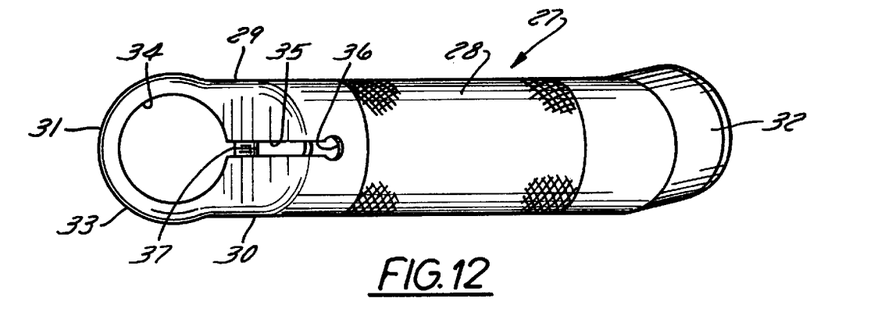
FIG. 12 is a side view of the second embodiment of the bar end.
Figure 13:
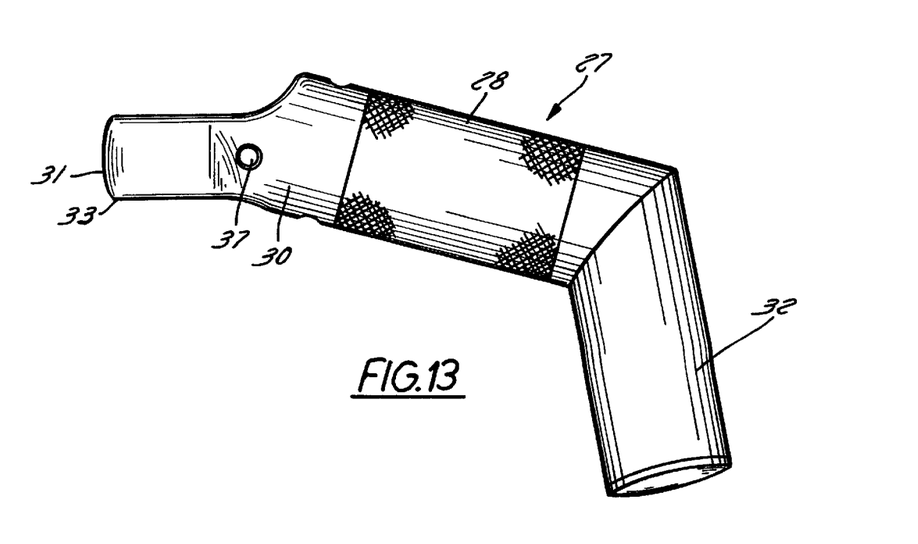
FIG. 13 is a bottom view of the second embodiment of the bar end.
Figure 14:
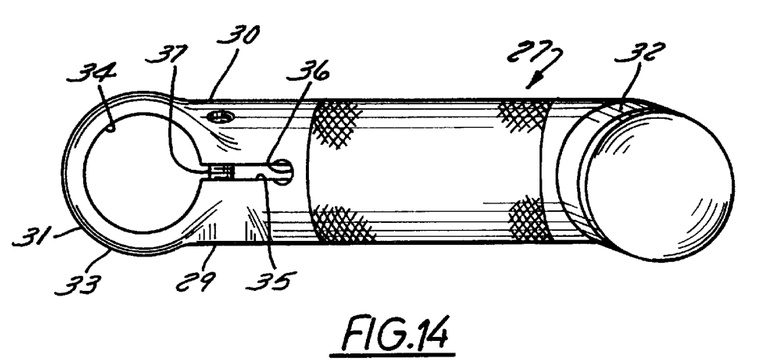
FIG. 14 is a side (opposite FIG. 12) view of the second embodiment of the bar end.
Figure 15:
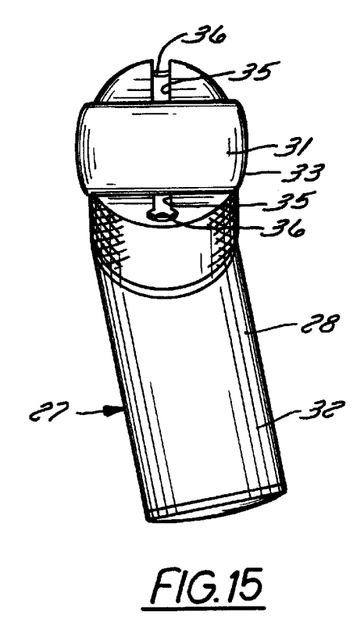
FIG. 15 is a rear view of the second embodiment of the bar end.
Figure 16:
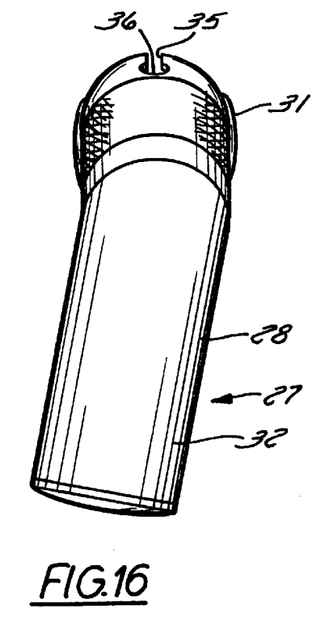
FIG. 16 is a front view of the second embodiment of the bar end.
Figure 17:
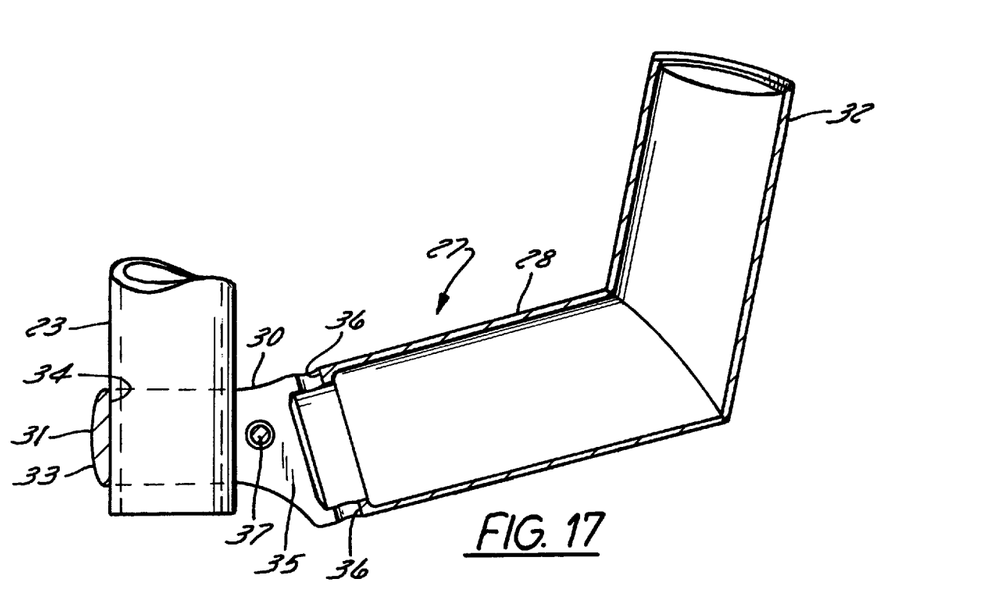
FIG. 17 is a cross sectional view of the second embodiment of the bar end illustrating the clamping means for attaching the bar end to the handlebar on a bicycle.
Figure 18:
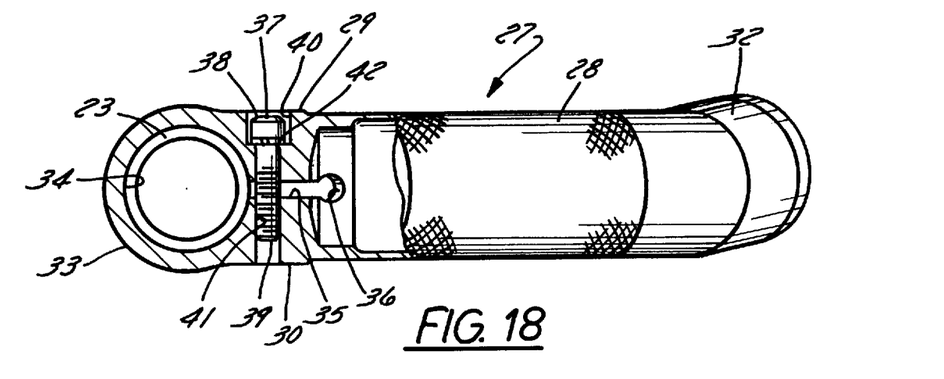
FIG. 18 is a partial sectional view of the second embodiment of the bar end illustrating the clamping means for attaching the bar end to the handlebar on a bicycle.

For illustrative purposes, the handlebar 23 depicted in the drawings consists essentially of a generally horizontal tubular member providing a first pair of gripping surfaces 25 and 26 for the rider's hands. Of course, there are many styles and shapes of handlebars, and the present invention is not meant to be limited to only the straight type of handlebars depicted in FIGS. 1 and 10 but rather the bar ends disclosed herein are capable of being used on any handlebars having a tubular portion with an outer circumference with corresponds generally to the internal circumference of the substantially cyclindrical opening in the bar end described here.

The bar end 27 may be generally described as a tubular body member 28 having a first end 31 and a second end 32. On the first end 31 of the bar end 27 is a clamping means connected to the bar end by a necked down section for attaching the bar end 27 to the tubular portion of the handlebar 23.

The clamping means for attaching the bar end 27 to the handlebar 23 is comprised of a continuous wall section 33 which extends from a first side portion 29 of the tubular body member 28 of the bar end 27 circumferentially around the handlebar 23 and is joined to a second side portion 30 of the tubular body member 28 of the bar end 27. The continuous wall section 33 defines a substantially cyclindrical opening 34 in the bar end 27, said opening 34 being flat and having a diameter corresponding generally to the outer circumference of the handlebar 23. The flat cyclindrical opening 34 formed by the continuous wall section 33 may be reduced in diameter by virtue of a slot 35 which extends from the cylindrical opening 34 inwardly into the center of the tubular body member 28 of the bar end. The cylindrical opening 34 functions to provide a uniform clamping force to that portion of the handlebar 23 in contact with the inner walls of the opening. The slot 35 is essentially a gap which separates the first and second side portions 29 and 30 of the tubular body member of the bar end. The slot 35 has a relatively uniform thickness starting from the cylindrical opening 34 and extending inwardly a distance into the tubular body member 28 of the bar end 27, and then terminates at a substantially cylindrical relief opening 36, the diameter of the relief opening 36 being slightly greater than the uniform thickness of the slot 35, as illustrated for instance in FIGS. 3, 5, 9, 12, 14 and 18. The slot 35 of course extends into both the upper and lower wall portions of the tubular body member 28 of the bar end 27.

At a portion of the bar end 27 immediately adjacent the cylindrical opening 34 for the handlebar 23 is a fastener 37. The fastener 37 extends perpendicularly across the gap from the first side portion 29 to the second side portion 30 of the tubular body member 28 of the bar end 27. The fastener is composed of a head 38 and a threaded shaft 39. There is a clearance hole 40 in the first side portion 29 of the tubular body member 28 of the bar end 27 and a threaded hole 41 in the second end portion 30. The head 38 of the fastener 37 naturally engages a stop surface 42 in the clearance hole 40 and the shaft 39 is threadably engaged in the threaded hole 41. Consequently, normal clockwise rotation of the threaded fastener 37 causes the first side portion 29 of the tubular body member 28 of the bar end 27 to become compressed toward the second side portion 30. This tightening action in turn causes the diameter of the cylindrical opening 34 to be reduced to thereby tighten the bar end 27 onto the end of the handlebar 23.

The two embodiments shown in the drawings differ only in that the first embodiment depicted in FIGS. 1–9 has a smooth rounded end portion (opposite the clamping means) and the second embodiment has an angled end portion. The difference is largely a matter of personal choice of the rider.

The bicycle handlebar bar end presented herein has been described in specific reference to two preferred embodiments shown in the drawings. Specific details disclosed above and illustrated in the drawings are naturally presented for descriptive purposes only. Therefore, specific structural and functional details disclosed above are not to be interpreted as limiting, but merely as a basis for the claims and for teaching one skilled in the art to variously employ the present invention in any appropriately detailed manner. Changes may be made in the details of construction, arrangement or operation of the invention without departing from the spirit of the invention.

Finally, it should be noted that the applicant herein has also filed an application for a design patent, said design patent application having been filed on the same date and under the same inventor, assignee and title as the present application. Accordingly, any subject matter disclosed in said design patent application is fully incorporated herein by reference.

What is claimed is:

1. A bicycle handlebar end capable of attachment to a substantially tubular handlebar, said bar end comprising:

a tubular body member, said tubular body member having a first end and a second end;

on said first end, a necked down portion connected to a clamping means for attaching the bar end to the handlebar;

said clamping means being comprised of a continuous wall section extending from a first portion of the tubular body member circumferentially around the substantially tubular handlebar to a second portion of the tubular body member of the bar end, said continuous wall section defining a substantially flat cylindrical opening having a diameter corresponding generally to an outer circumference of the tubular handlebar;

said clamping means further comprising a slot extending from the cylindrical opening inwardly into the tubular body member of the bar end and including a substantially circular relief opening thereby providing a space between the first portion and the second portion of the tubular body member of the bar end;

a threaded fastener extending perpendicularly across said slot from the first portion to the second portion of the tubular body member of the bar end, said fastener comprising a head and a threaded shaft, the head engaging a stop surface in the first portion;

wherein tightening of said threaded fastener biases the stop surface towards the second portion and causes the first portion to become compressed toward the second portion thereby causing the continuous wall section to become reduced in diameter and compressed around the handlebar.

2. The bicycle handlebar bar end according to claim 1, wherein said slot separates the first portion and the second portion of the tubular body member of the bar end, said slot having a relatively uniform thickness starting from the cylindrical opening and extending inwardly a distance into the tubular body member of the bar end, with the slot terminating at said substantially circular relief opening, said relief opening having a diameter greater than said uniform thickness.

3. The bicycle handlebar end of claim 1, wherein said first portion includes a clearance hole and said second portion includes a threaded hole;

whereby clockwise rotation of said fastener causes said compression of the first and second portions of the tubular body member of the bar end.

4. A bicycle handlebar bar end capable of attachment to a substantially tubular handlebar, said bar end comprising:

a tubular body member, said tubular body member having a first end and a second end;

on said first end, a clamp adapted to attach the bar end to the handlebar, wherein said clamp is connected to said bar end by a necked down portion on said bar end;

said clamp being comprised of a continuous wall section extending from a first portion of the tubular body member circumferentially around the substantially tubular handlebar to a second portion of the tubular body member of the bar end, said continuous wall section defining a substantially cylindrical flat opening having a diameter corresponding generally to an outer circumference of the tubular handlebar;

said clamp further comprising a slot extending from the cylindrical opening inwardly into the tubular body member of the bar end thereby separating the first portion and the second portion of the tubular body member of the bar end, said slot having a relatively uniform thickness starting from the cylindrical opening and extending inwardly a distance into the tubular body member of the bar end, with said slot terminating at a substantially circular relief opening, said relief opening having a diameter greater than said uniform thickness;

a threaded fastener extending perpendicularly across said slot from the first portion to the second portion of the tubular body member of the bar end, said fastener comprising a head and a threaded shaft, the head engaging a stop surface in the first portion;

wherein tightening of said threaded fastener biases the stop surface towards the second portion and causes the first portion to become compressed toward the second portion thereby causing the continuous wall section to become reduced in diameter and compressed around the handlebar.

* * * * *